(12) United States Patent
Bei et al.

(10) Patent No.: US 10,572,557 B2
(45) Date of Patent: Feb. 25, 2020

(54) DETECTING RELEVANT FACETS BY LEVERAGING DIAGRAM IDENTIFICATION, SOICAL MEDIA AND STATISTICAL ANALYSIS SOFTWARE

(71) Applicant: International Business Machines Corporation, Armonk, NY (US)

(72) Inventors: Xiao Xian Bei, Xi'an (CN); Zhili Guo, Beijing (CN); Peng Hui Jiang, Beijing (CN); Fang Ming Li, Beijing (CN); Gang Zhan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 14/932,133

(22) Filed: Nov. 4, 2015

(65) Prior Publication Data

US 2017/0124201 A1    May 4, 2017

(51) Int. Cl.
*G06F 16/9535*    (2019.01)
*G06F 16/29*    (2019.01)
(Continued)

(52) U.S. Cl.
CPC ........ *G06F 16/9535* (2019.01); *G06F 16/248* (2019.01); *G06F 16/24575* (2019.01);
(Continued)

(58) Field of Classification Search
CPC ......... G06F 17/30867; G06F 17/30241; G06F 17/30528; G06F 17/30554; G06F 17/30657; G06F 17/30696; G06F 17/30699; G06F 17/30247; G06F 17/30253; G06F 16/2477; G06F 16/5854
See application file for complete search history.

(56) References Cited

U.S. PATENT DOCUMENTS

| 8,762,890 B2 | 6/2014 | Falchuk et al. |
| 2004/0027349 A1* | 2/2004 | Landau ............ G06F 17/30548 345/440 |

(Continued)

FOREIGN PATENT DOCUMENTS

WO    2012015889 A1    2/2012

OTHER PUBLICATIONS

Chen, Zhe, Michael Cafarella, and Eytan Adar. "Diagramflyer: A search engine for data-driven diagrams." In Proceedings of the 24th International Conference on World Wide Web, pp. 183-186. ACM, 2015.*

(Continued)

*Primary Examiner* — Tamara T Kyle
*Assistant Examiner* — Jesse P Frumkin
(74) *Attorney, Agent, or Firm* — Gilbert Harmon, Jr.

(57) ABSTRACT

An approach to finding facets of big data across multiple subject fields which have mutual relevance and provide useful information and insights. The approach is based on an analysis of diagrams associated with facets found in big data, such as that available on the internet, and the results of the analysis are further refined through a regional analysis and a search of social media data for events pertaining to the facets. Embodiments can further make use of statistical analysis software to provide statistical evidence related to the facets that can validate the results and findings of facet relevancy.

13 Claims, 4 Drawing Sheets

(51) Int. Cl.
*G06F 16/248* (2019.01)
*G06F 16/335* (2019.01)
*G06F 16/338* (2019.01)
*G06F 16/33* (2019.01)
*G06F 16/2457* (2019.01)
*G06F 16/583* (2019.01)

(52) U.S. Cl.
CPC ............ *G06F 16/29* (2019.01); *G06F 16/335* (2019.01); *G06F 16/338* (2019.01); *G06F 16/3331* (2019.01); *G06F 16/583* (2019.01)

(56) References Cited

U.S. PATENT DOCUMENTS

| | | | |
|---|---|---|---|
| 2006/0020597 A1 | 1/2006 | Keating et al. | |
| 2006/0125827 A1* | 6/2006 | Adereth | G06F 17/30554 345/440 |
| 2008/0215546 A1* | 9/2008 | Baum | G06F 17/30551 |
| 2010/0036789 A1 | 2/2010 | Marleau | |
| 2012/0203775 A1* | 8/2012 | Tsudaka | G06F 17/30259 707/723 |
| 2012/0221589 A1* | 8/2012 | Shahar | G06F 17/30551 707/758 |
| 2013/0246403 A1 | 9/2013 | Uefuji | |
| 2013/0275905 A1 | 10/2013 | Bhaskaran et al. | |
| 2014/0372172 A1* | 12/2014 | Fr as Mart nez et al. | G06Q 30/0202 705/7.31 |
| 2015/0049951 A1 | 2/2015 | Chaturvedi et al. | |
| 2015/0199830 A1* | 7/2015 | Hiltz-Laforge | G06T 11/206 707/748 |
| 2016/0306859 A1* | 10/2016 | Musuvathi | G06F 17/30551 |
| 2017/0053008 A1* | 2/2017 | Frenkel | G06Q 30/0282 |

OTHER PUBLICATIONS

Al-Zaidy, Rabah A., and C. Lee Giles. "Automatic extraction of data from bar charts." In Proceedings of the 8th International Conference on Knowledge Capture, p. 30. ACM, 2015.*

Bei et al., "Detecting Relevant Facets by Leveraging Diagram Identification, Social Media and Statistical Analysis Software", U.S. Appl. No. 15/262,211, filed Jun. 19, 2017, 27 pages.

IBM Appendix P, list of patents or patent applications treated as related, filed herewith, 2 pages.

* cited by examiner

DETECTING RELEVANT FACETS BY LEVERAGING DIAGRAM IDENTIFICATION, SOICAL MEDIA AND STATISTICAL ANALYSIS SOFTWARE

BACKGROUND

The present invention relates generally to the field of data analysis, and more particularly to diagram analysis.

The field of data analysis seeks to find relationships between two or more variables present in data (e.g., text, documents, images, diagrams, etc. . . . ) in order to find meaningful insights that have value. The massive volume of data available online today, sometimes referred to as "big data," presents an opportunity to discover those relationships using data pertaining to real world information and determine useful insights from them. Diagram analysis makes use of diagrams, such as those that can be found in big data, to achieve the same purpose.

SUMMARY

According to one embodiment of the present invention, a method for determining relevant facets of big data is provided, the method comprising searching a first one or more data sources for one or more facets, wherein the one or more facets comprise at least one of facet data and facet diagrams; creating one or more facet diagrams for the at least one or more facet data; comparing the one or more facet diagrams to a base facet diagram to generate a first group of relevant facet diagrams based on a diagrammatic analysis; filtering the first group of relevant facet diagrams based on at least one of a regional analysis and a search of social media to generate a second group of relevant facet diagrams; and outputting the second group of relevant facet diagrams. A corresponding computer program product and computer system are also disclosed herein.

DETAILED DESCRIPTION

With the recent rise of mobile computing technology, there is an enormous volume of data, i.e., big data, available today to analyze, from many different subject fields (such as medical, commercial, business, industrial, etc. . . . ). Embodiments of the present invention recognize that there is a great need for an efficient method of sifting through and analyzing this data to determine possible insights to be gained from it, which would not otherwise have been apparent. With this in mind, embodiments of the present invention provide a solution involving the use of diagram analysis from data obtained via available data sources (e.g., the internet) to determine facets, i.e., specific data points corresponding to real world information occurring over a certain period of time, from different subject fields that have relevance, i.e., the facets are found to have a relationship that indicates that there is useful information to be gained. For illustrative purposes, some general examples of facets can include, but are not limited to, the number of occurrences of a certain disease and the number of purchases of a certain consumer product, and it should be noted that facets, such as these, can pertain to a localized geographical region (e.g., a city, county, state, country, etc. . . . ).

Embodiments of the present invention can make use of available data on the internet, both structured and unstructured data, to find and/or construct diagrams associated with different facets and compare these diagrams to determine with a high degree of confidence which of the facets have relevance, i.e., are closely related to one another. Some embodiments can further leverage social media data and statistical analysis to validate the findings of facet relevance from the initial diagram comparison and/or further filter the number of facets that have relevance.

Figure 1A:
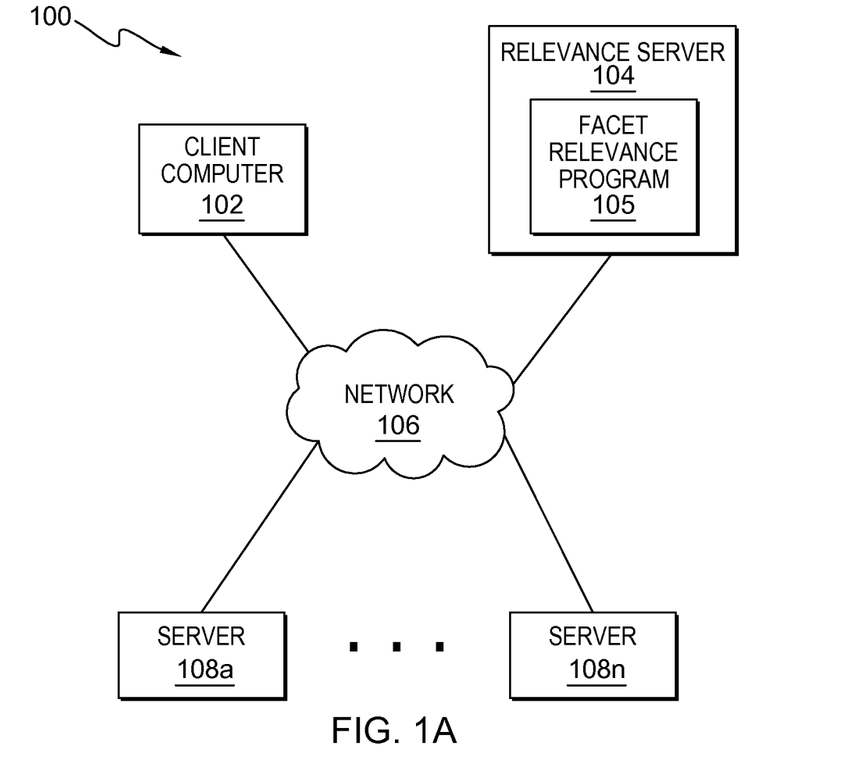
FIG. 1A-B is a functional block diagram illustrating a distributed data processing environment and a functional block diagram depicting components of a facet relevance program, respectively, in accordance with an embodiment of the present invention.

The present invention will now be described in detail with reference to the figures. FIG. 1A is a functional block diagram illustrating a distributed data processing environment 100, in accordance with one embodiment of the present invention. Distributed data processing environment 100 includes computer system 102, relevance server 104 and servers 108a-n, all interconnected over network 106. It should be noted that servers 108a-n are representative of any number of servers connected via network 106.

Client computer 102 can be a laptop computer, tablet computer, netbook computer, personal computer (PC), a desktop computer, a personal digital assistant (PDA), a smart phone, or any programmable electronic device capable of communicating with relevance server 104 and servers 108a-n via network 106. Relevance server 104 is a computer system comprising facet relevance program 105 which is configured to detect facets from multiple subject fields that have relevance, based on a search of data available from servers 108a-n. Servers 108a-n can be any computer systems configured to serve requests made over network 106 for data and can be, for example, but are not limited to, web servers.

According to some embodiments, a user of client computer 102, through the use of a web browser, for example, can make requests to relevance server 104 for information associated with relevant facets and/or configure settings related to the functionality of facet relevance program 105. Relevance server 104 and/or facet relevance program 105 can require that users attempting access from client computer 102 via network 106 have been preauthorized to do so.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between client computer 102, relevance server 104 and servers 108a-n. Relevance server 104 can include internal and external hardware components, as depicted and described in further detail with respect to FIG. 4.

Figure 1B:
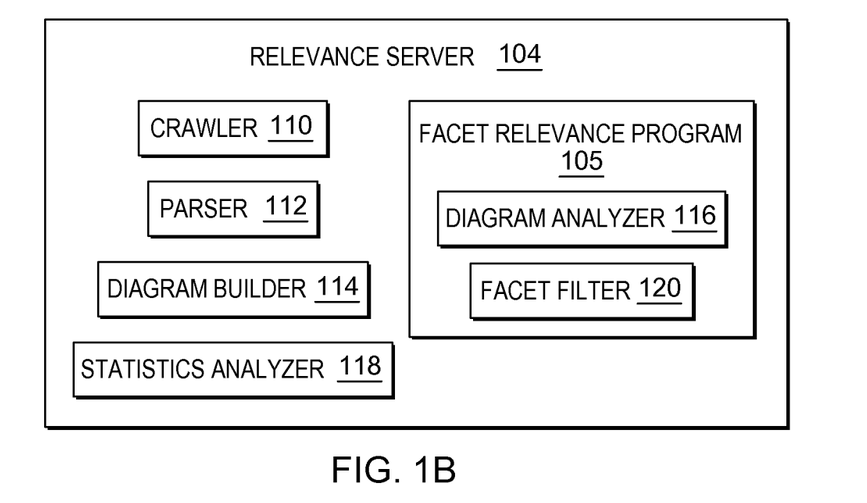

FIG. 1B is a functional block diagram depicting components of relevance server 104, in accordance with an embodiment of the present invention. Relevance server 104 comprises crawler 110, parser 112, diagram builder 114, statistics analyzer 118 and facet relevance program 105, which comprises diagram analyzer 116 and facet filter 120. Crawler 110 is configured to search (i.e., crawl) and retrieve structured and/or unstructured available data on the internet such as, but not limited to, text, documents, images, diagrams, tables, spreadsheets, videos and audio files, to find facets that have relevance. An example of a facet can be a line representing a set of data points plotted on a diagram, corresponding to real world information, which shows one or more trends over time. Any facet represented in a diagram can be herein referred to as a "facet diagram." Another example of a facet can be textual information that corresponds to a set of data points associated with real world information, in which case parser 112 parses the text using known methods (e.g., natural language processing, etc. . . . ), extracts information related to the data points and sends that information to diagram builder 114, which can be a software program configured to create diagrams, plotting the data points over time. It should be noted that diagram builder 114 can receive any type of available data other than diagrams (i.e., facet data) as input that it can create facet diagrams from based on known methods.

Facet relevance program 105 is designed to determine that two or more facets have relevance, indicating that there is some useful insight to be discovered. Diagrams associated with facets (i.e., facet diagrams) retrieved by crawler 110 and those created by diagram builder 114 are compared by diagram analyzer 116 to determine facet relevance, as will be discussed in further detail subsequently with regard to FIG. 3. Statistics analyzer 118 is software such as IBM SPSS Statistics by International Business Machines Corporation, for example, configured to analyze data related to potentially relevant facets in order to further verify the findings with statistical evidence. A facet filter 120 is configured to further filter facets for relevancy based on data retrieved from social media (e.g., Facebook, Twitter, other web blogs, etc. . . . ) and a comparison of facet relevance from different geographical regions (e.g., cities, counties, states, countries, etc. . . . ), as will be discussed subsequently.

Figure 2:
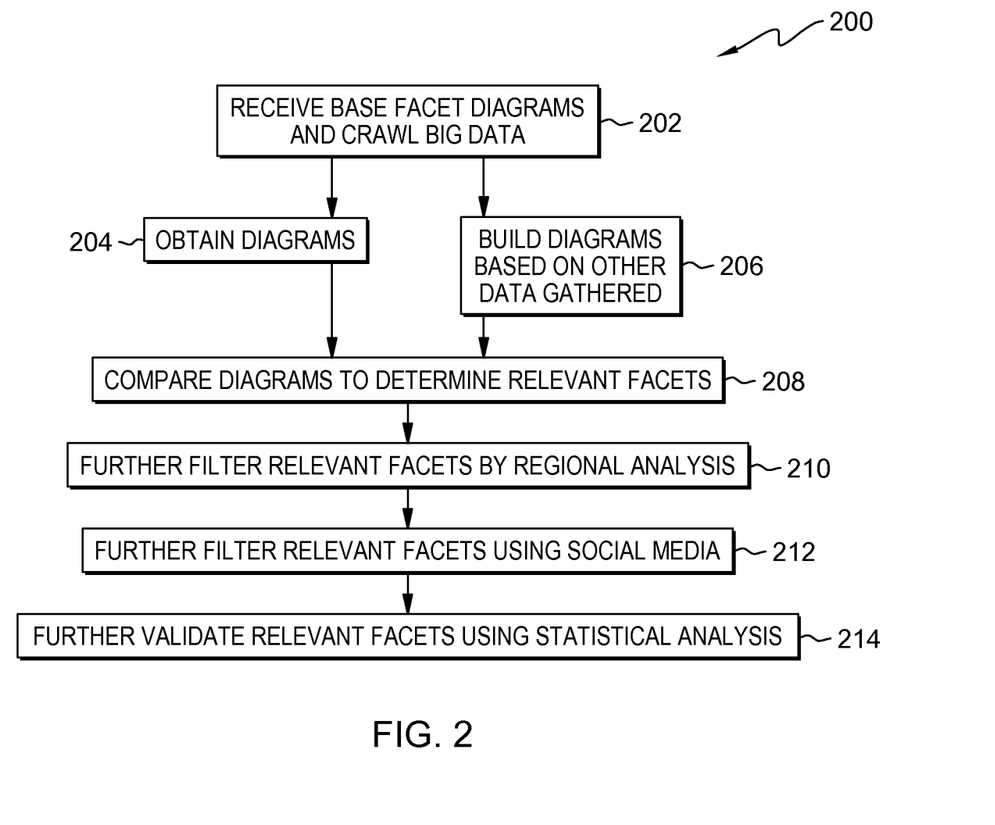
FIG. 2 is a flowchart depicting operational steps of a facet relevance program within the data processing environment of FIG. 1, in accordance with an embodiment of the present invention.

FIG. 2 is a flowchart 200 depicting operational steps of facet relevance program 105 in determining relevant facets, in accordance with an embodiment of the present invention. Facet relevance program 105 receives as input from a user, at block 202, at least one base facet diagram (which can have been created by diagram builder 114), which can be something that the user wants to know more about, such as the occurrence of a particular disease in a certain area, for example. Facet relevance program 105 is configured to send crawler 110, at block 202, to search through available data to retrieve facets in the form of diagrams (i.e., facet diagrams), at block 204, or to retrieve facets in forms of data other than diagrams (i.e., facet data), wherein a facet diagram is created by diagram builder 114, at block 206. A user of facet relevance program 105 can preconfigure a search criteria to direct the search of available data at block 202. A user can, for example, create a search criteria comprising one or more specified keywords (i.e., topics), one or more specified geographical regions and/or one or more specified subject fields, wherein the search criteria will direct crawler 110 as to which available data to search through. It should be noted, however, that the available data searched by crawler 110 is not limited to data which is related to the search criteria specified by a user.

Diagrams retrieved and diagrams created will be compared, at block 208, by diagram analyzer 116 to the base facet diagram to determine facet relevancy based on similar trends within a predetermined threshold, as will be discussed subsequently with regard to FIG. 3. If one or more facets (i.e., facet diagrams) are determined to have relevancy to the base facet diagram in the manner just described, embodiments can, at block 210, retrieve similar facets (related to those one or more facets and/or the base facet diagram) that originate from different geographical regions in order to determine that the relationship of the one or more facets to the base facet diagram is consistent over multiple geographical regions (i.e., a regional analysis), which can be accomplished by facet filter 120. Facets not found to be relevant to the base facet diagram, based on the regional analysis, can be filtered out by facet filter 120 as will be discussed subsequently.

According to some embodiments, a group of facet diagrams (including the base facet diagram) that are found to have relevancy to one another across multiple geographical regions can be further filtered and validated, at block 212, using crawler 110 and parser 112 to retrieve social media data associated with events related to the facet diagrams, and the further filtering will be discussed in greater detail subsequently. Further validation for the group of relevant facet diagrams can be provided, at block 214, by using statistics analyzer 118 to provide statistical support for facet relevancy, based on an analysis of other data sources related to facet diagrams in the group. It is to be noted that the function provided in block 214 is not required by all embodiments of the present invention but can be optionally included in some embodiments. It should be further noted that at the ends of steps 208, 210 and 212, wherein facet diagrams have been filtered for relevancy to the base facet diagram in the various manners described, the facet diagrams and information pertaining to them (e.g., the source of the facet diagram, what the facet diagram pertains to, etc. . . . ) can be presented (i.e., output) to the user of facet relevance program 105 for review.

Figure 3:
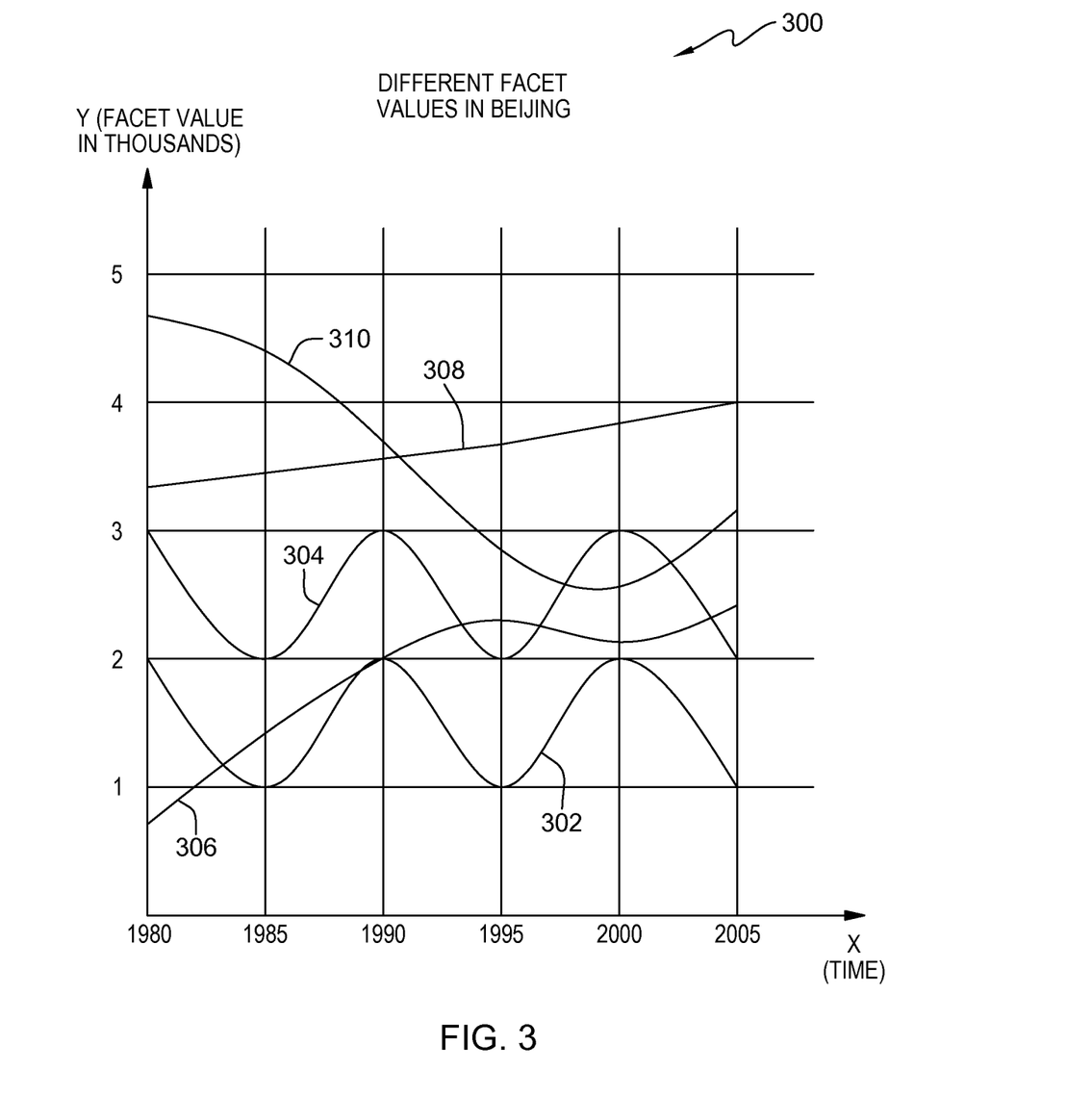
FIG. 3 is a diagram depicting multiple, overlaid facets, in accordance with an embodiment of the present invention.

FIG. 3 is a diagram 300 depicting multiple, overlaid facets, plotted with respect to time (i.e., the x-axis), in accordance with an embodiment of the present invention. It should be noted that overlaying facets on one diagram is not required by embodiments of the present invention, but is merely being used here for illustrative purposes. Facets 302, 304, 306, 308 and 310 have been retrieved from data available on the internet by crawler 110 and all correspond to different information, respectively, that has occurred in Beijing, China, over the same period of time. Facet 302 is the base facet diagram that a user of facet relevance program 105 has started with and facets 304, 306, 308 and 310 have all been retrieved from available data sources. Facets 302, 304, 306, 308 and 310 can all be seen to have one or more trends (i.e., periods of increase or decrease) but facets 302 and 304 in particular can be seen to have the same trends occurring over the same periods of time, indicating that they are relevant to one another. According to embodiments, diagram analyzer 116 can compare individual facet diagrams to determine relevancy by dividing each diagram into the same segments of time, determining the trend (i.e., increasing or decreasing) of each diagram for each segment of time and assigning a confidence score based on how the trends of each diagram compare over each corresponding segment of time. If two diagrams have the same trend for a corresponding segment of time, one point can be added to their mutual confidence score for determining facet relevancy, whereas if the two diagrams have different trends (i.e., one is increasing and one is decreasing) for a corresponding segment of time, one point can be subtracted. If the absolute value of the total mutual confidence score for two or more diagrams (of potentially relevant facets) is at least a certain percentage of the total number of time segments into which the diagrams are divided, which can be based on predetermined criteria, then the facets are found to have relevance to one another.

Looking at diagram 300, five distinct time segments are shown on the x-axis, 1980-1985, 1985-1990, 1990-1995, 1995-2000 and 2000-2005. Facets 302 and 304 have the same trends for five corresponding time segments (i.e., they both increase from 1985-1990 and 1995-2000 and they both decrease from 1980-1985, 1990-1995 and 2000-2005) and thus facets 302 and 304 have a mutual confidence score of 5. Since the absolute value (i.e., 5) of this mutual confidence score is 100% of the total number of time segments (i.e., 5 out of 5), this is an indication that facets 302 and 304 are relevant to one another. As another example, consider facets 302, 304 and 308 together. There are two corresponding time segments out of the five total time segments for which they all share the same trends (i.e., facets 302, 304 and 308 all increase from 1985-1990 and 1995-2000) and three corresponding time segments for which they do not all have the same trends (i.e., Facets 302 and 304 both decrease from 1980-1985, 1990-1995 and 2000-2005 while facet 308 increases during these times). Thus, facets 302, 304 and 308 have a mutual confidence score of −1 (i.e., 1+1−1−1−1), which has an absolute value of 1, which is 20% of the total number of time segments (i.e., 1 out of 5). This can be an indication that facets 302, 304 and 308 are not all mutually relevant to one another, which will depend on a predetermined threshold for facet relevancy.

The minimum percentage, based on the ratio of an absolute value of a confidence score to a total number of time segments, required for diagram analyzer 116 to identify two or more facet diagrams, including the base facet diagram, as having relevance can be based on a predetermined and optionally user-adjusted threshold (e.g., diagram analyzer 116 is configured to look for at least 75% relevancy between two or more facet diagrams). Additionally, diagram analyzer 116 can analyze two or more facet diagrams for trend similarity (as previously described) using corresponding time segments of equal duration but from different periods in history. For example, one facet diagram containing data from 1950-1960 is divided into five segments of two years a piece and another facet diagram containing data from 1990-2000 is also divided into five segments of two years a piece and the analysis of these two diagrams for corresponding time segments (i.e., corresponding in terms of sequence) reveals an 80% facet relevancy, even though the two facets relate to different pieces of information displaced in historical time. Further, diagrams are not required by embodiments to be divided into segments of time that are all equal in duration (e.g., diagrams can be divided into a segment of six months, then a segment of twelve months, then a segment of eight months, etc. . . . ).

It should also be noted that some embodiments can further add or subtract confidence score points during diagram analysis based on how peaks and troughs of different diagrams compare. For example, if two diagrams both have either a peak or a trough occurring within a predetermined range of time, one confidence score point (+1) can be added to their mutual confidence score, or, if one of the two diagrams has a peak occurring while the other has a trough occurring within a predetermined range of time, one confidence score point can be subtracted (−1) from their mutual confidence score.

Relevant facets 302 and 304 are associated, for the sake of this hypothetical illustrative example, with events that have occurred in Beijing, China over a certain period of time. To further filter a group of relevant facets, such as facets 302 and 304, facet filter 120 can be configured to send crawler 110 to search for similar facets (pertaining to similar events) in different geographical regions of the world. One example of similar facets in different geographical regions could be the occurrence of liver cancer over time in Beijing and the occurrence of liver cancer over time in New York. If similar facets to those in the group are identified in different geographical regions and also determined to have relevance (based on the diagrammatic analysis) in those different geographical regions, information pertaining to all of the different geographical regions for facets in the group (e.g., how many different regions where similar facets have relevance, where the regions are located, etc. . . . ) can be returned to a user of facet relevance program 105 for review. Further filtering of relevant facets can be accomplished based on the determination that similar facets from different geographical regions are either relevant or not.

As an example, if similar facets to facets 302 and 304 are identified in multiple other cities besides Beijing, China and also determined to have relevancy (within the predetermined threshold set for the diagrammatic analysis) within those cities, this can be compared against a predetermined criteria (default or user-configured) which defines how facets are filtered based on a geographical analysis. For example, facet filter 120 can be configured to require that two or more relevant facets in a first city have similar, relevant facets in at least five other geographical regions, otherwise the two or more facets in the first city will not meet the criteria for relevancy based on the geographical analysis. The example provided herein is only intended to be illustrative with regard to embodiments of the present invention and does not intend to restrict the many variations of this type of filtering functionality apparent to one skilled in the art.

According to some embodiments of the present invention, if a group of two or more facets (i.e., facet diagrams) has been found to meet the predetermined threshold for relevancy based on the previously described diagrammatic and geographical analysis, logical support for the finding and further facet filtering can be augmented with the use of social media. Facet filter 120 can be configured to send crawler 110 to crawl social media sites and use parser 112 to find data related to events associated with the facets, based on the information the events pertain to and the time frames in which they occurred. Data retrieved from social media sites pertaining to events associated with the facets can be managed by facet filter 120 and returned to the user of facet relevance program 105 for further review, which can include information such as, but not limited to, the number of event occurrences on social media (i.e., "hits") and verbatim transcripts of the social media data. In the event that no social media data can be found that relates to any events associated with one or more of the relevant facets in the group, excluding the base facet diagram, facet filter 120 can be preconfigured, for example, to disqualify those facets for relevancy. The preconfiguring just discussed can be default or user-adjusted and can be based on a threshold number of social media hits, e.g., if a certain predetermined number (i.e., threshold) of social media events relating to one or more facets (excluding the base facet diagram) in a group of relevant facets are not found, the one or more facets are disqualified for relevancy in the group, etc. . . . . Again, many variations may be apparent to one skilled in the art implementing embodiments of the present invention.

According to other embodiments of the present invention, facet relevance which has been filtered based on a search of social media data can be further verified by the use of statistical analysis software. Statistics analyzer 118 is software designed to retrieve data (e.g., data related to the relevant facets) from a variety of sources and perform statistical analysis on it using known methods, providing statistical evidence in support of the findings of facet relevancy. Data related to the facets used by statistics analyzer 118 can be, for example, but is not limited to, detailed data owned by a corporation or institution that it will provide to a customer for a fee but that is not available on a public website, or other data that is otherwise publicly available online.

Facet relevance program 105 can suggest to a user some sources of detailed data that can be retrieved from servers 108a-n which may be of value in further verifying facet relevance. That is, facet relevance program 105 has determined that certain available data is related to one or more facets in a group of relevant facets and can be used by statistics analyzer 118 to potentially reveal meaningful statistical evidence that adds support to the finding of facet relevancy. Such data, determined to be related to the one or more facets, can be presented to the user of facet relevance program 105 and/or a list of uniform resource locators (URLs) associated with the data can be presented to the user, for example. The aforementioned list of URLs can be presented, for example, in order of estimated usefulness, from highest to lowest. According to some embodiments, free public summaries of available data which can be accessed for a certain fee can be analyzed to determine if it would be data worth paying for to have for statistical analysis. Statistical calculations performed by statistics analyzer 118 for all data submitted to it can be reviewed by the user of facet relevance program 105 who can decide whether or not the results of the calculations validate the findings of relevancy amongst a group of facets.

Figure 4:
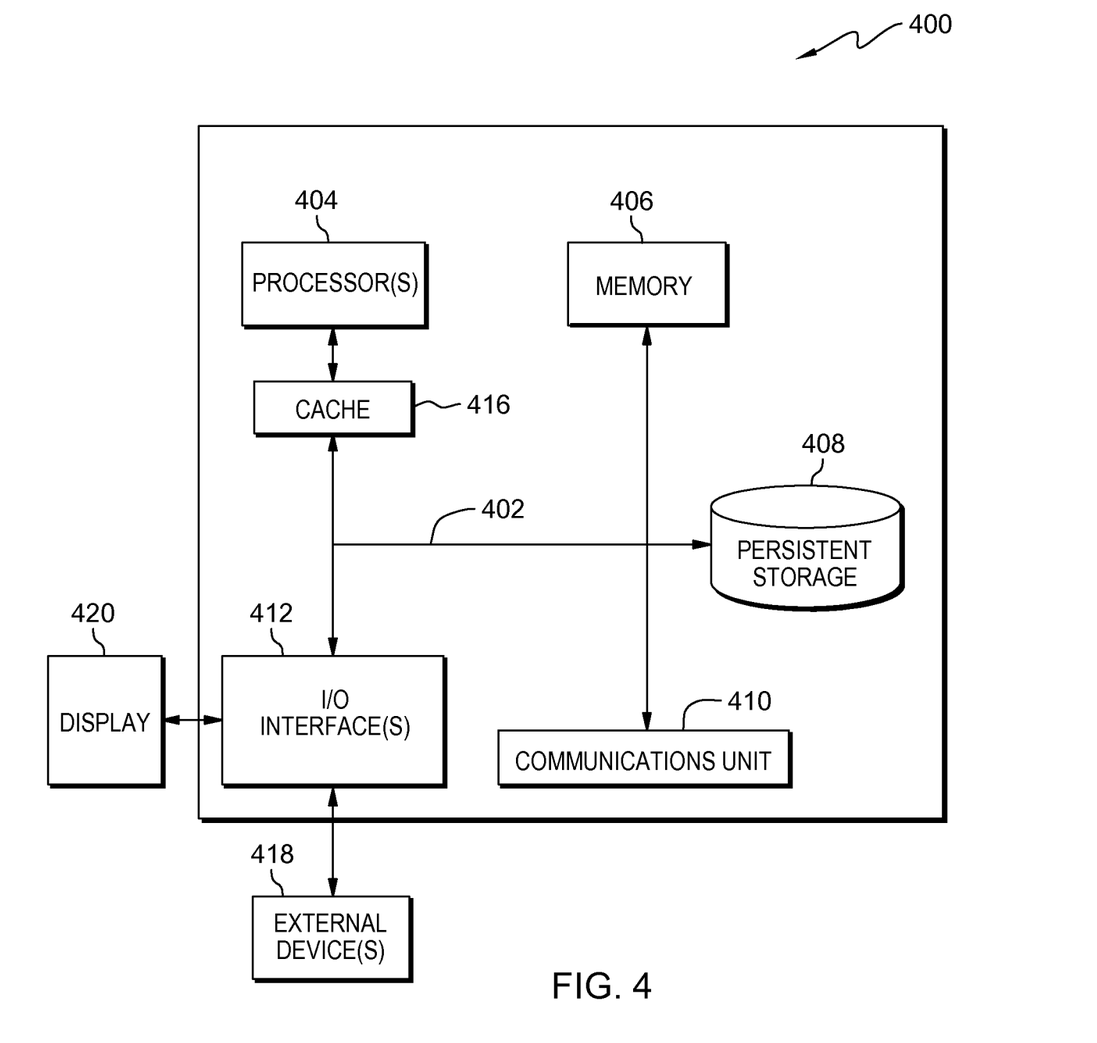
FIG. 4 is a block diagram of components of a relevance server, in accordance with an embodiment of the present invention.

Turning to FIG. 4, a block diagram 400 of components of relevance server 104 is depicted, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Relevance server 104 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Facet relevance program 105 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Facet relevance program 105 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., facet relevance program 105, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for improving the determination of relevant facets of big data associated with a user input, the computer program product comprising:
   one or more computer readable storage media and program instructions stored on the one or more computer readable storage media, the program instructions comprising:
   program instructions to receive a user input from a user input device as a basis for relevant facets;
   program instructions to search a first one or more data sources for one or more facets, wherein the one or more facets comprise facet data, both structured and unstructured, and facet diagrams;
   program instructions to create one or more facet diagrams for the one or more facet data, based on transforming the unstructured facet data comprising audio files and at least one of images and video files into structured facet data plotted on a diagram as a trend over time;

program instructions to compare the one or more facet diagrams to a base facet diagram to generate a first group of relevant facet diagrams based on a diagrammatic analysis, wherein the diagrammatic analysis comprises comparing peaks and troughs of the one or more facet diagrams, from different geographical areas, across a plurality of corresponding time segments for a predetermined threshold;

program instructions to filter the first group of relevant facet diagrams based on a regional analysis and a search of social media to generate a second group of relevant facet diagrams; and program instructions to output the second group of relevant facet diagrams.

2. The computer program product of claim 1, further comprising:

program instructions to present a list of one or more second data sources, which provide data associated with the second group of relevant facet diagrams, for statistical analysis via statistical analysis software.

3. The computer program product of claim 1, wherein the one or more facets comprise at least one of structured and unstructured data.

4. The computer program product of claim 1, wherein the program instructions to search the first one or more data sources is based on a preconfigured search criteria.

5. The computer program product of claim 1, wherein the diagrammatic analysis comprises comparing trends of the one or more facet diagrams across a plurality of corresponding time segments for a predetermined threshold.

6. The computer program product of claim 1, wherein the regional analysis comprises retrieving similar facets, associated with the first group of relevant facet diagrams, from one or more geographical regions other than those associated with the first group of relevant facet diagrams, comparing the similar facets based on the diagrammatic analysis and filtering the first group of relevant facet diagrams based on the comparison of the similar facets, according to a predetermined criteria.

7. The computer program product of claim 1, wherein the program instructions to filter the first group of relevant facet diagrams based on the search of social media comprises a retrieval of one or more social media events, associated with the first group of relevant facet diagrams, within a predetermined threshold.

8. A computer system for improving the determination of relevant facets of big data associated with a user input, the computer system comprising:

one or more computer processors;

one or more computer readable storage media;

program instructions stored on the one or more computer readable storage media for execution by at least one of the one or more processors, the program instructions comprising:

program instructions to receive a user input from a user input device as a basis for relevant facets;

program instructions to search a first one or more data sources for one or more facets, wherein the one or more facets comprise facet data and facet diagrams;

program instructions to create one or more facet diagrams for the at least one or more facet data, based on transforming the unstructured facet data comprising audio files and at least one of images and video into structured facet data plotted on a diagram as a trend over time;

program instructions to compare the one or more facet diagrams to a base facet diagram to generate a first group of relevant facet diagrams based on a diagrammatic analysis, wherein the diagrammatic analysis comprises comparing peaks and troughs of the one or more facet diagrams, from different geographical areas, across a plurality of corresponding time segments for a predetermined threshold;

program instructions to filter the first group of relevant facet diagrams based on a regional analysis and a search of social media to generate a second group of relevant facet diagrams; and program instructions to output the second group of relevant facet diagrams.

9. The computer system of claim 8, further comprising:

program instructions to present a list of one or more second data sources, which provide data associated with the second group of relevant facet diagrams, for statistical analysis via statistical analysis software.

10. The computer system of claim 8, wherein the program instructions to search the first one or more data sources is based on a preconfigured search criteria.

11. The computer system of claim 8, wherein the diagrammatic analysis comprises comparing trends of the one or more facet diagrams across a plurality of corresponding time segments for a predetermined threshold.

12. The computer system of claim 8, wherein the regional analysis comprises retrieving similar facets, associated with the first group of relevant facet diagrams, from one or more geographical regions other than those associated with the first group of relevant facet diagrams, comparing the similar facets based on the diagrammatic analysis and filtering the first group of relevant facet diagrams based on the comparison of the similar facets, according to a predetermined criteria.

13. The computer system of claim 8, wherein the program instructions to filter the first group of relevant facet diagrams based on the search of social media comprises a retrieval of one or more social media events, associated with the first group of relevant facet diagrams, within a predetermined threshold.

* * * * *